United States Patent
Cooper

(10) Patent No.: US 7,180,622 B2
(45) Date of Patent: Feb. 20, 2007

(54) METHOD AND SYSTEM FOR AUTOMATICALLY FORWARDING AN IMAGE PRODUCT

(75) Inventor: Andrew T. Cooper, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 872 days.

(21) Appl. No.: 10/303,514

(22) Filed: Nov. 25, 2002

(65) Prior Publication Data

US 2004/0100652 A1 May 27, 2004

(51) Int. Cl.
*G06F 3/12* (2006.01)

(52) U.S. Cl. .................. 358/1.15; 358/1.18; 358/401; 358/408; 358/522; 358/3.28

(58) Field of Classification Search ............... 358/1.15, 358/401, 408, 522, 3.28, 1.18
See application file for complete search history.

(56) References Cited

U.S. PATENT DOCUMENTS 5,859,920 A * 1/1999 Daly et al. .................. 382/115
6,429,923 B1 * 8/2002 Ueda et al. .................. 355/40
6,900,882 B2 * 5/2005 Iida ............................. 355/77
2002/0063744 A1 5/2002 Stephens, Jr.

FOREIGN PATENT DOCUMENTS

EP 1128282 A2 * 8/2001

* cited by examiner

*Primary Examiner*—Kimberly Williams
*Assistant Examiner*—Lam Andrew
(74) *Attorney, Agent, or Firm*—Thomas J. Strouse

(57) ABSTRACT

A method is disclosed of automatically forwarding hard copy image products to a designated recipient, comprising the steps of: analyzing a digital image and developing a unique ID with respect to the image based on the analysis; storing the unique ID and associated order informations with respect to the image in a storage database, the order informations including additional information and a designated recipient for receiving a hard copy image product made using the digital image; printing the digital image on to a medium using a first printer so as to obtain the hard copy image product; scanning the hard copy image product subsequently by a scanning device and analyzing the digital image so as to obtain the unique ID and accessing the database for obtaining the order informations using the unique ID.

33 Claims, 3 Drawing Sheets

METHOD AND SYSTEM FOR AUTOMATICALLY FORWARDING AN IMAGE PRODUCT

FIELD OF THE INVENTION

This invention is in the field of document tracking and, more particularly, the invention relates to a system for tracking an image in a high production printing work flow using an image matching algorithm.

BACKGROUND OF THE INVENTION

Sharing images using the Internet has become a very popular activity. Images may be sent electronically as an email attachment to recipients having a computer, or entire albums of images may be shared by posting them to a personal web page. Through the use of various on-line photo services, such as the Ofoto™ service, albums of images may be uploaded and conveniently shared by sending the web address of the album to friends and family.

Of course, not everyone has a computer, and in contrast to the methods of electronic sharing just described, sharing a hard copy print using such an online photographic service is more difficult. It is necessary for the sharer to upload to such a service provider not only an image, but also any message the sharer desires to include with the image, and the mailing address of the recipient. The service provider must first print the image product and message separately and then put both in a package. The address must then be added to the package, for example using an address label, or by printing directly on the package, or be written by hand. Postage is then added and the package mailed. During each of these steps by the provider care must be taken to make sure the image product matches the message and that both are mailed to the right address. Currently this process is carried out entirely manually and each step is labor-intensive, time-consuming and fraught with human error. In a high volume photofinishing operation, geared normally to the printing and assembly of a large number of multiple print orders, the task becomes an especially difficult one.

It is well known to automatically track printed documents in the workflow of a printing operation using, for example, a bar code printed on the document. Bar code scanners placed downstream of a document printer can be used to track and direct the printed documents through later steps in a complex operation. Adapting this method to a photographic printing operation by placing a visible bar code in the image area of a photographic print or other image product has obvious drawbacks. A tracking bar code might be placed on the back of a print, but this would require a bar code printer, and perhaps a device for applying a bar code label to the back of the print.

Published U.S. Patent Application 2002/0063744, by Stephens, discloses an invisible bar code printed with a UV fluorescing ink, used to track printed documents in a printing system. While such a method could potentially be adapted to track hard copy photographic prints, the method of Stephens still requires the insertion of an additional specialized bar code printer in the system to print the bar code. In addition, appropriate inks would be needed to successfully overprint a bar code on imaging media without harming the image.

To solve these and other problems, an improved method is needed to enable automatic tracking of hard copy photographic image products in a complex printing operation. Ideally, the method should not employ a visible marking system, and not require additional equipment beyond the original image printer to add the mark to the product.

SUMMARY OF THE INVENTION

In answer to these and other problems of the prior art, according to one aspect of the present invention, there is provided a method of automatically forwarding hard copy image products to a designated recipient, comprising the steps of analyzing a digital image and developing a unique ID with respect to the image based on the analysis; storing the unique ID and associated order informations with respect to the image in a storage database, the order informations including additional information and a designated recipient for receiving a hard copy image product made using the digital image; printing the digital image on to a medium using a first printer so as to obtain the hard copy image product; scanning the hard copy image product subsequently by a scanning device and analyzing the digital image so as to obtain the unique ID and accessing the database for obtaining the order informations using the unique ID.

According to another aspect of the present invention, there is provided a method of automatically providing information with respect to a hard copy image product comprising the steps of analyzing a digital image so as to obtain a unique ID with respect to the digital image; storing the unique ID and associated order information with respect to the digital image in a storage database; printing the digital image on an image medium to produce the hard copy image product using a first digital printer; scanning the hard copy image product so as to obtain the unique ID and accessing the database for obtaining the order information and printing the order information on the hard copy image product using a second digital printer.

According to yet another aspect of the present invention there is provided a method of automatically providing information with respect to a hard copy image product comprising the steps of generating a random number unique ID with respect to a digital image; embedding the unique ID in the digital image as a digital watermark; storing the unique ID and associated order information with respect to the digital image in a storage database; printing the digital image on a hard copy medium to produce the hard copy image product using a first digital printer; scanning the hard copy image product and extracting the digital watermark and obtaining the unique ID; and accessing the database for obtaining the order information and printing the order information on the hard copy image product using a second digital printer.

According to still another aspect of the present invention, there is provided a system for printing and automatically forwarding hard copy image products to a designated recipient, comprising an image server having a processor for analyzing a digital image and developing a unique ID with respect to the image based on the analysis; a database connected to the server for storing the unique ID and associated order informations, the order informations including additional information and a designated recipient for receiving the hard copy image product made using the digital image; a first printer connected to the server for printing the digital image onto a medium to obtain a hard copy image product; a scanner connected to the server for digitally scanning the hard copy image product, the scan data being analyzed by the processor to obtain the unique ID and access the database for obtaining the order informations using the unique ID; and a second printer for printing the additional information for use in forwarding the hard copy image product to the designated recipient.

In accordance with still another aspect of the present invention there is provided a method of automatically forwarding hard copy image products to a designated recipient, comprising the steps of:

analyzing a digital image and developing a unique ID with respect to the image based on the analysis;

storing the unique ID and associated order information with respect to the image in a storage database, the order information includes a designated recipient for receiving a hard copy image product made using the digital image;

printing the digital image on to a medium using a first printer so as to obtain the hard copy image product;

scanning the hard copy image product subsequently by a scanning device and analyzing the digital image so as to obtain the unique ID and accessing the database for obtaining the order information using the unique ID, the scanning information is also used to obtain product information regarding the hard copy image product; and using the product information for verification with the order information.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
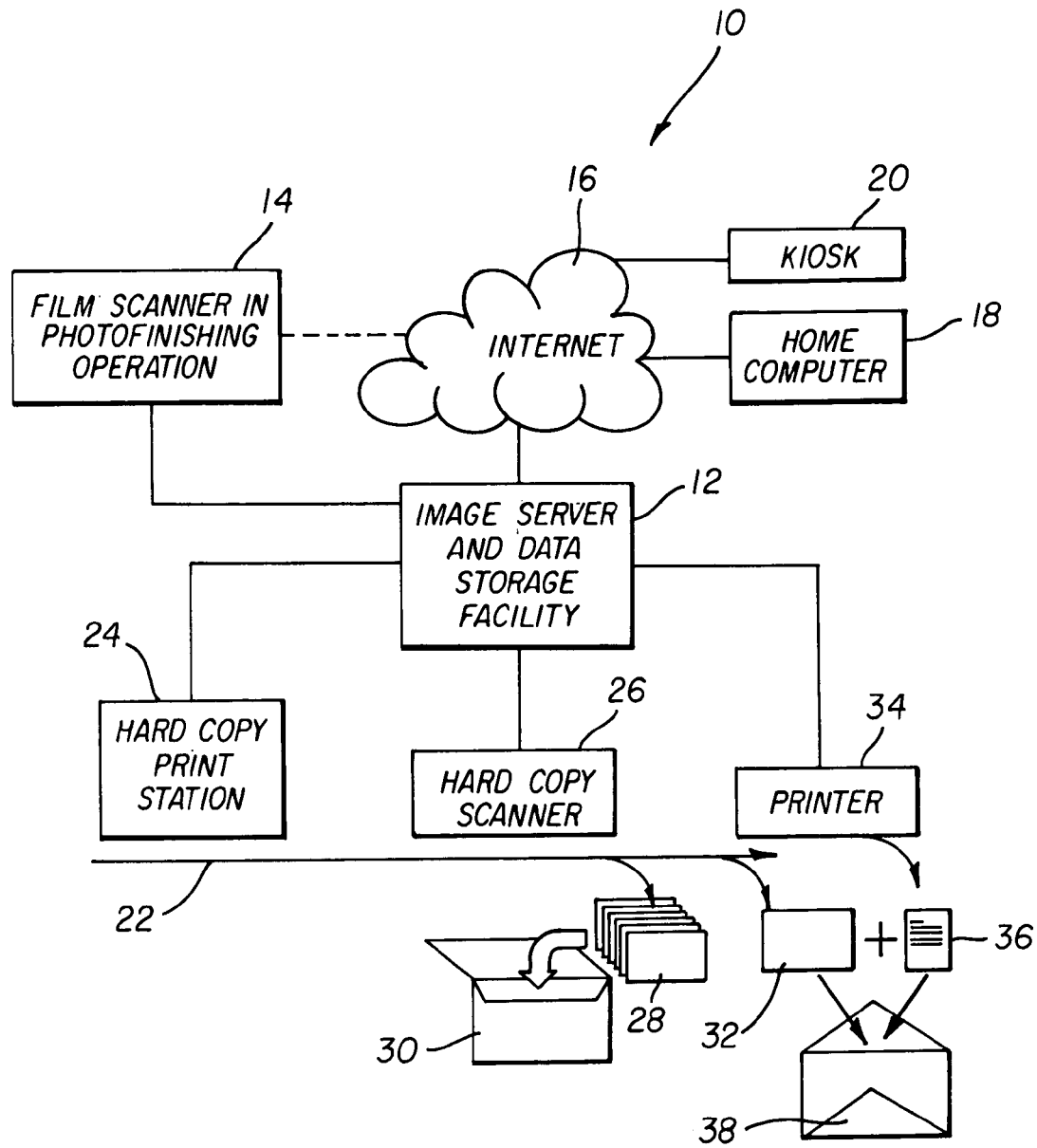
FIG. 1 is a schematic diagram of a digital photographic printing and print-tracking system made in accordance with the invention.

In FIG. 1 is shown a schematic diagram of a digital photographic printing and print-tracking system 10 made in accordance with the invention. Printing system 10 includes an image server and data storage facility 12 where digital image data and customer- and order-related information is stored. Digital image data may be sent to image server 12 by a number of routes, including from a film scanner 14 located, for example, in a photofinishing operation. In FIG. 1, film scanner 14 is shown connected directly to the image server 12, but if film scanner 14 is at a location geographically remote from the server, it may also be connected via a communications channel such as the Internet 16. Other pathways to send digital image data to image server 12 include uploading image data from a home computer 18 where images are stored on the hard drive of home computer 18, or are stored on removable memory media (not shown) which can be read by home computer 18. Images may also be first transferred to home computer 18 from a digital camera (not shown), or may be accessed from image files stored remotely at an online image storage facility. By yet another route, images may be transferred to image server 12 from a image service kiosk 20 where, for example, a customer may connect a digital camera or insert a removable storage medium to transfer images to service kiosk 20. Both home computer 18 and service kiosk 20 are shown connected to image server 12 via a communications channel such as the Internet 16.

Order information regarding hard copy image product orders including, order information, recipients' addresses and/or any messages to be included along with the hard copy products may also be input from home computer 18, or service kiosk 20, using an input device such as a touch screen or keyboard. This order information is stored in association with the appropriate image files in image server 12. If a customer has no access to a computer or kiosk, requests for hard copy image product can also be submitted in writing by filling out an order form including the recipient's address, providing an image, either in a hard copy format or digital format, and any accompanying message information desired. The completed form is then submitted to a photofinishing service provider. The photofinishing service provider may then convert the submitted information to digital form and upload it to image server 12 along with the corresponding image data and order information.

Image server 12 has a processing unit (not shown) which is used to carry out various image processing steps which may be required for stored image files, including any color correction or image enhancement needed prior to printing. The processor in image server 12 is also for the purpose of computing a unique ID for each image file based upon an analysis of the corresponding image data itself. Once computed, the unique ID is stored in association with the digital image for which it was computed in the memory of image server 12 and is associated with the order information submitted by the requesting customer. Typically the ID is determined when the digital image is obtained and is immediately associated with the order information.

A hard copy image product made by printing an image file may be automatically identified later using this unique ID. Because the unique ID is based upon image data itself, the identification of a hard copy image product may be accomplished without the need to include any kind of human or machine readable indicia on the print. Scanning of the image product after it has been printed using a digital scanner yields a digital image file for the product. The corresponding unique ID can then be calculated for this product image file, and the calculated unique ID can be matched to the previously stored unique ID for the corresponding image data file residing in image server 12. Thus, the order information previously stored can be obtained and associated and compared with the finished image products produced. Using the store order information appropriate collation, packaging, billing and shipping of the customer order can take place. In addition, by scanning the products additional information may be obtained regarding the finished order, such as, the number of prints produced the size of the prints. This allows automatic checking and or verification, of the finished products with the order information for the specified ID. For example, if a customer ordered four 4×6 prints and two 8×10 prints, the scanner can scan the images not only for the ID, but also determine the number and size of the prints present and then determine if the completed order matches the order information. If the finished order does not match with the customer order associated with the ID, a notification to the service provider to determine what the problem may be and provide any appropriate remedial action.

Any of a number of methods may be used to compute such a unique ID for a digital image. A very simple method of creating a unique ID for a digital image is to first reduce the size of the image file to the size of a "thumbnail" image, for example on the order of 100×100 pixels. The resulting reduced 10,000 pixel file can stored as a unique ID in association with the original, higher resolution image file. Later, a print which was made from the high resolution image file can be scanned and a corresponding reduced "thumbnail" calculated for the print (unique ID for the print). A pixel-by-pixel comparison by the computer processor in image server 12 of all the pixels in the two thumbnails provides a basis for identifying the print as having been made from the original image file.

Another method for computing a unique ID for an image file is disclosed in the commonly assigned, co-pending published European Patent Application EP 1 128 282, by Mehrotra and Zhu. In the '282 application, Mehrotra and Zhu show how to determine a pattern representation for a digital image. Once determined, the pattern representation is stored as a unique ID in association with the image from which it was calculated and used to later match to the pattern representation calculated for a hard copy image product made from the image file. The '282 application is hereby incorporated by reference.

Yet another means for identifying a hard copy image product without having to add a human or machine readable mark is to embed a unique ID as a human indiscernible digital watermark in the corresponding image file from which the product is made. Digital watermarks are well known and a technique particularly useful for embedding a digital watermark in an image, using the technique of steganography, is disclosed in commonly assigned U.S. Pat. No. 5,859,920 to Daly, et al. The '920 patent is hereby incorporated by reference in its entirety. In practice, the unique ID for a particular image file is generated using a random number generator and then stored in association with the particular file in image server 12. This unique ID is embedded in the image data file by the method of Daly and a hard copy image product is made using the image file. Later, when the product is scanned using a scanner, the embedded watermark is detected and the unique ID extracted and compared to the stored unique ID numbers to identify to which image file the image product corresponds.

A schematic representation of the workflow of hard copy image products through printing system 10 is indicated along path 22. Print station 24 in printing system 10 is used to print the hard copy image products. Print station 24 may comprise any digital print making means suitable for printing photographic quality images, for example a CRT, LED, or laser-based printer for silver halide media. An ink jet, thermal dye transfer, or electrophotographic printer may also be used. If a silver halide media printer is used, print station 24 also comprises means for photographically processing the silver halide print media (not shown).

Once products have been printed at print station 24, they are routed to hard copy scanner 26, disposed along the workflow path 22 downstream of print station 24. Hard copy scanner 26 may be either a linear-array or area-array scanner. Hard copy image products are scanned and the image data transferred to image server 12 in order to compute the unique ID for that product, and/or extract any embedded digital watermark in the product. If the unique ID computed, or watermark extracted, does not match any stored ID or watermark, then it is assumed the product is a print which is a part of a regular photofinishing order. Prints 28 which are part of a regular photofinishing order are collated by any of a number of well-known collation methods, including manual or automatic collation, and are placed in order envelope 30 for return to a customer.

If the unique ID or watermark for a hard copy image product scanned at hard copy scanner 26 matches any ID or watermark stored in image server 12, then the product is recognized as part of an image product order. Once this is recognized a signal may be sent to an operator who can manually retrieve the print product 32, or the print product 32 may be automatically diverted to another pathway in the system. Any messages to be included with the print product 32 are retrieved and printed by second printer 34. Message 36 may be printed as a separate document to be included with the order, or alternatively, may be printed on the reverse of the print product 32 (not shown). The product order is assembled in envelope 38 either manually, or by use of any of a number of well-known apparatuses for automatic collation of documents for mailing, and then mailed. Printer 34 may be any digital printer suitable for printing text.

Figure 2:
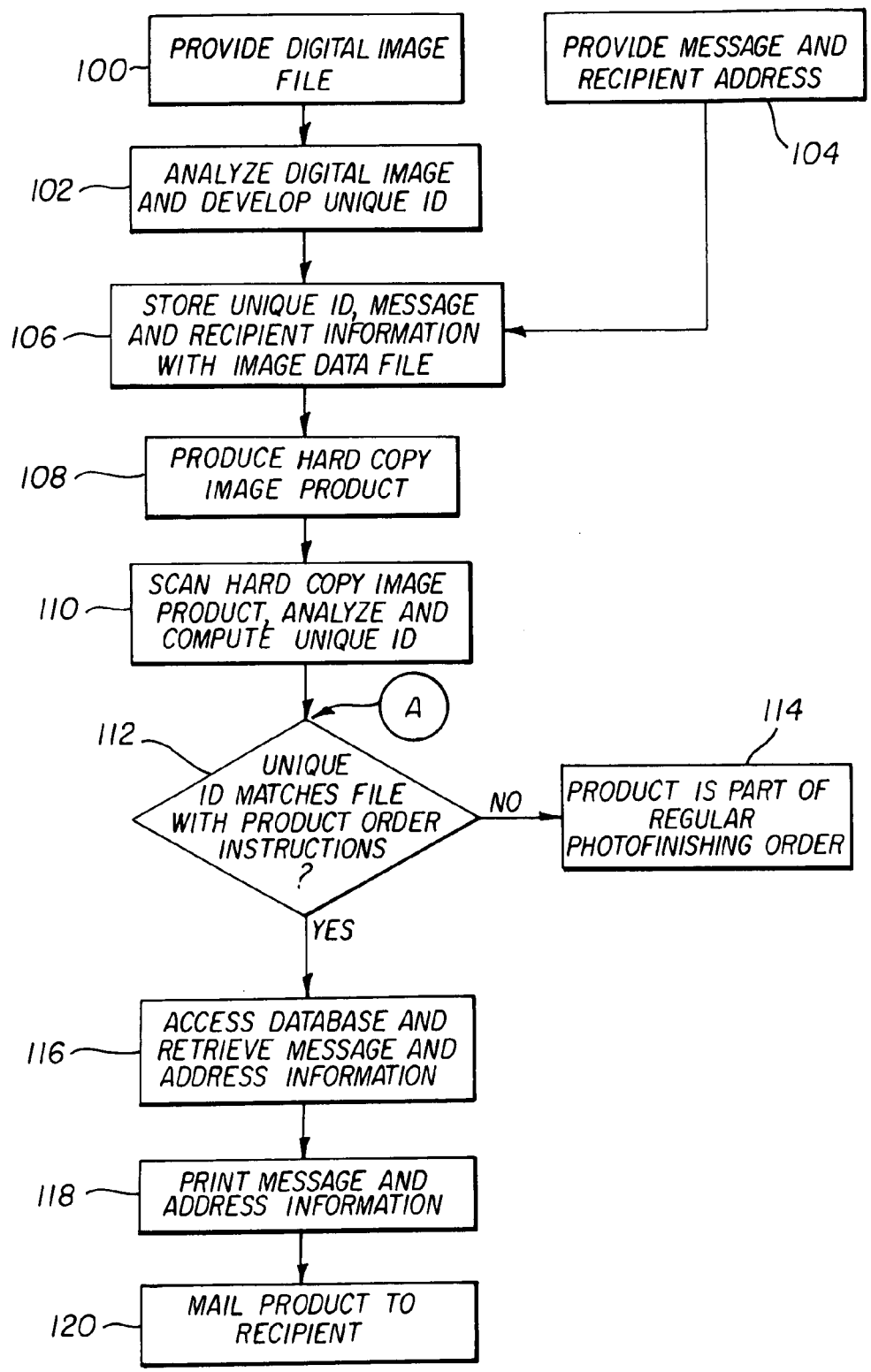
FIG. 2 depicts a flow diagram of the steps in the operation of a preferred embodiment of the present invention.

In order to more clearly understand the invention, the steps required in its practice will now be described in detail. In FIG. 2 is shown a flow diagram of the steps in the operation of a preferred embodiment of the printing and print-tracking system of FIG. 1. Once a digital image file has been provided (step 100), a processor in image server 12 carries out an analysis of the image file by one of the methods described in detail earlier, and derives a unique ID for that image (step 102). Order informations, including the address information for a recipient and any message to be included with the order, that has been provided by a customer (step 104) by one of the means of input discussed previously for FIG. 1. The order information is associated with the digital image file and are stored in image server 12 (step 106). The ID, order information and image file may be stored together on a single storage device or stored separately with appropriate pointers to each other. Next, a hard copy image product is printed from the digital image file at print station 24 (step 108). Print means at station 24 may be any digital print means suitable for printing photographic quality images, including a silver-halide printer, ink jet, thermal dye transfer, or electrophotographic printers. A print station employing silver halide printing includes of necessity a step of photographic processing to develop the images (not shown). Hard copy image products may be made at print station 24 using either individual cut sheets of print media (i.e., one/print) or on a continuous roll of print media from which individual prints are later cut (cutting step not shown). Hard copy images printed at station 24 may include any hard copy image product, for example photographic prints in standard sizes (4×6, 5×7, etc), prints with borders, greeting cards, posters and the like.

Once a hard copy image product has been made, the product is transported to a hard copy scanner 26, which is typically located at a packing or assembly station, where it is scanned and the resulting image file from the scan is analyzed and the unique ID computed (step 110) by the same method used in step 102. The unique ID determined in step 110 is compared to the unique IDs for all the image files stored in image server 12, and when a matching data file is located, the file is examined for the presence of order informations (step 112). If there are no associated order informations, it is assumed that the product is part of a standard photofinishing print order and the print is collated in that order (step 114).

Order information associated with a unique ID is accessed from the image server 12 (step 116) and any appropriate order information or instruction is passed to a second printer 34 to be printed (step 118). Order information may include, by way of example but not limited to, any of the following: address information for the recipient, personal or advertising message to be included with the hard copy image product, or other graphical items such as company or product logos. Address information may be printed in any format and in any location, including address information on a mailing envelope or package, or on the back of a print to create a post card. Personal or advertising message information may be incorporated as part of the hard copy image product, for example by printing on the back of the product, or integrating the message suitably in a greeting card. Alternatively, personal message information may be printed as a separate insert to be included with the mailing of the image product. Also as previously discussed the order information can be compared with additional information obtained by the scanning operation to determine if the completed order is complete or accurate.

Once the text printed materials have been completed, they are combined with the hard copy image product and mailed to the recipient (step 120).

As discussed previously, another method of associating a hard copy image product with a unique ID is to embed the unique ID in the product as a human indiscernible digital watermark using steganographic techniques. Once embedded, the digital watermark may be retrieved later by scanning, and then decoded to determine the unique ID for the product. This method can provide an advantage in that detection and decoding of the watermark may require less processing power and/or time to execute than re-computing the unique ID itself from the scan.

Figure 3:
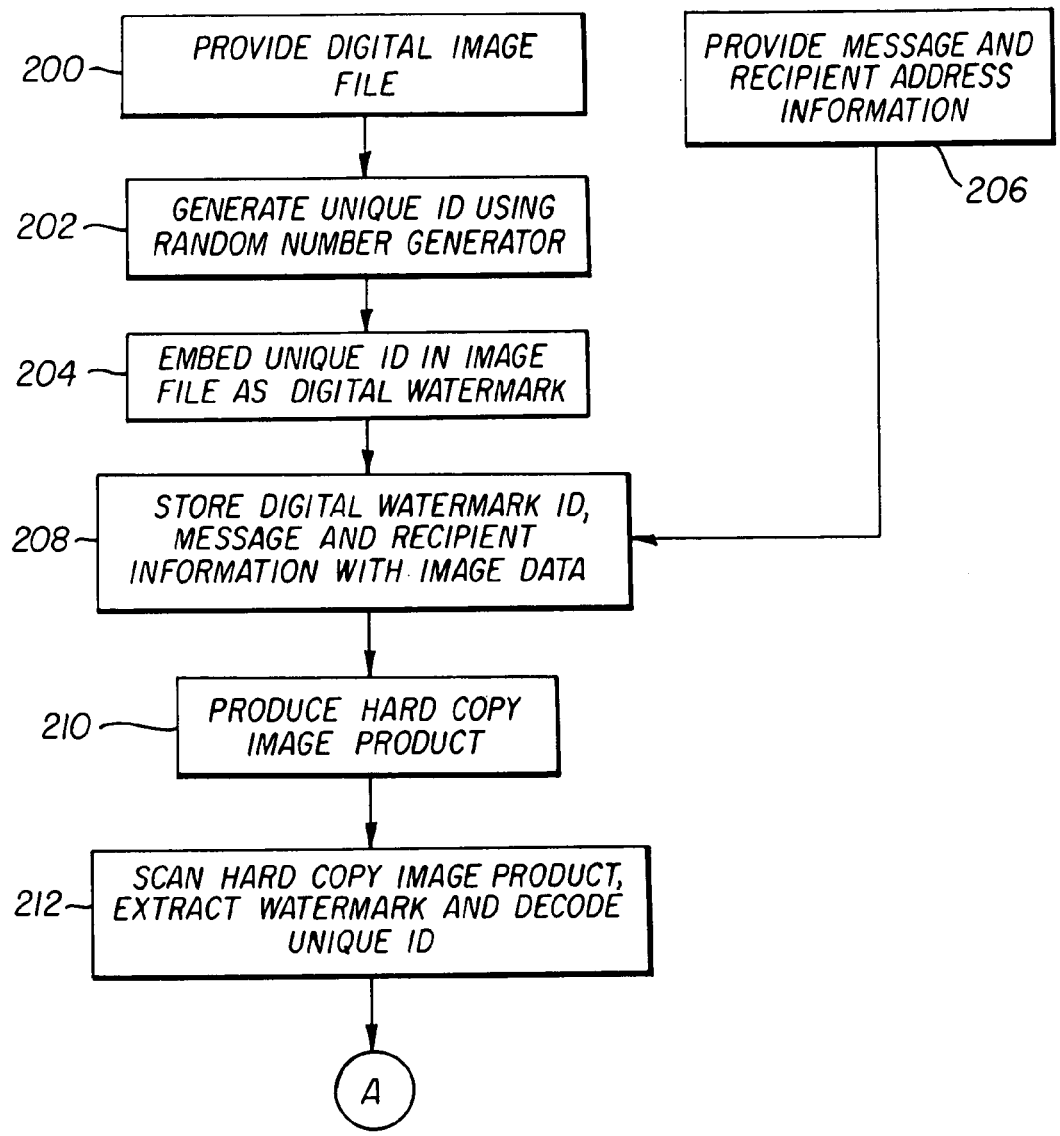
FIG. 3 depicts a flow diagram of the steps in the operation of an alternative embodiment of the present invention.

In FIG. 3 is presented a flow chart of the steps to be carried out in an embodiment of the invention using digital watermarking. First, a digital image file is provided in step 200 exactly as step 100, previously discussed, for the embodiment described in FIG. 2. In step 202, the processor in image server 12 then generates a unique ID for the image file using a random number generator. In step 204, the unique ID is embedded in the image file as a human indiscernible mark by the steganographic method of Daly referred to previously. Order informations, such as the address information for a recipient and any message to be included with the order, are provided by a customer (step 206), again using means of input discussed previously for FIG. 1. The order informations and the unique ID are stored together with the corresponding image file in image server 12 (step 208) and a hard copy image product is printed from the digital image file at print station 24 (step 210). Once a hard copy product has been made, the product is fed to a hard copy scanner 26 where it is scanned and the resulting image file from the scan is analyzed for the presence of a digital watermark (step 212). If detected, the watermark is decoded to determine the unique ID (step 212). At this point (point A in FIG. 3) the remaining steps in the process are identical to the steps beginning at point A (step 112) in FIG. 2 and continuing through to the end where the image product is forwarded to the recipient.

The invention has thus far been discussed with respect to various hard copy image products typically produced by printing on an imaging medium in the form of a sheet or roll. It will be easily recognized by one of skill in the art that the invention can be adapted also to work with other kinds of image-bearing products such as beverage mugs, T-shirts, mouse-pads, and the like. With image-bearing products such as these, print station 24 (FIG. 1) is adapted to print images on such products, typically by first printing an image on an intermediate transfer medium and heat transferring the image to the final product (T-shirt, mug, etc). For these alternative image-bearing products, hard copy scanner 26 is replaced with an image capture device, such as a digital camera, which can captures an image of the image-bearing product and transfer the image to server 12 where it can be analyzed to determine the unique ID.

The invention has been described in detail with particular reference to certain preferred embodiments thereof, but it will be understood that variations and modifications can be effected within the scope of the invention.

PARTS LIST

10 Printing system
12 Image server
14 Film scanner
16 Internet
18 Home computer
20 Service kiosk
22 Workflow path
24 Print station
26 Hard copy scanner
28 Prints
30 Order envelope
32 Print product
34 Printer
36 Message
38 Envelope
100 Step
102 Step
104 Step
106 Step
108 Step
110 Step
112 Step
114 Step
116 Step
118 Step
120 Step
200 Step
202 Step
204 Step
206 Step
208 Step
210 Step
212 Step

What is claimed is:

1. A method of automatically forwarding hard copy image products to a designated recipient, comprising the steps of:
   analyzing a digital image and developing a unique ID with respect to said image based on said analysis;
   storing said unique ID and associated order information with respect to said image in a storage database, said order information includes a designated recipient for receiving a hard copy image product made using said digital image;
   printing said digital image on to a medium using a first printer so as to obtain said hard copy image product;
   scanning said hard copy image product subsequently by a scanning device and analyzing said digital image so as to obtain said unique ID and accessing said database for obtaining said order information using said unique ID; and
   using said order information for further processing of said hard copy image product.

2. The method according to claim 1 further comprising the steps of forwarding said hard copy image product to said designated recipient obtained from scanning said hard copy image product.

3. The method according to claim 1 wherein said unique ID further comprises a reduced size image file derived from said digital image.

4. The method according to claim 1 wherein said unique ID further comprises a pattern representation of said digital image.

5. The method according to claim 1 wherein said hard copy image product comprises one of the following:
   a print;
   a post card;
   a print with border;
   a folded greeting card;
   a poster; and
   a mug.

6. The method according to claim 1 wherein said order information further comprises at least one of the following:
   name and address of recipient;
   message to recipient;
   date and/or time; and
   graphics (company logo or letterhead).

7. The method according to claim 1 wherein said hard copy image product comprises a print and additional information is printed on the back side of said print by a second printer.

8. The method according to claim 3 wherein said order information further comprises address information for said designated recipient.

9. The method according to claim 1 wherein said order information further comprises message information for said designated recipient.

10. The method according to claim 1 wherein said hard copy image product comprises a print and additional information is printed on a separate document by a second printer.

11. The method according to claim 6 wherein said order information further comprises a message to be printed on an insert document by a second printer.

12. The method according to claim 6 wherein said order information further comprises a recipient address information printed on an envelope.

13. The method according to claim 1 wherein said first printer comprises a photosensitive printer.

14. The method according to claim 1 wherein said first printer comprises a printer selected from one of the following: an ink jet printer, an electrophotographic printer, a thermal dye transfer printer.

15. The method according to claim 7 wherein said second printer comprises a printer selected from one of the following: an ink jet printer, an electrophotographic printer, a thermal dye transfer printer.

16. The method according to claim 1 wherein said scanning device further comprises a linear array scanner.

17. The A method according to claim 1 wherein said scanning device further comprises an area array scanner.

18. The method according to claim 1 further comprising the step of determining as aspect of said order from said scanning of said hard copy image product and for verification of said hard copy image product with said order information.

19. The method according to claim 18 wherein said verification comprises determining if said hard image products matches said order information.

20. A method of automatically providing information with respect to a hard copy image product comprising the steps of: analyzing a digital image so as to develop a unique ID with respect to said digital image; storing said unique ID and associated order information with respect to said digital image in a storage database; printing said digital image on an image medium to produce said hard copy image product using a first digital printer; and scanning said hard copy image product so as to obtain said unique ID and accessing said database for obtaining said order information and printing said order information on said hard copy image product using a second printer.

21. The method according to claim 20 wherein said second printer prints said information on a non image-bearing portion of said image hard copy image product.

22. The method according to claim 20 wherein said hard copy image product comprises one of the following:
   a print;
   a post card;
   a print with border;
   a folded greeting card;
   a poster; and
   a mug.

23. The method according to claim 20 wherein said order information comprises at least one of the following:
   name and address of recipient;
   message to recipient;
   date and/or time; and
   graphics to print on back (company logo or letterhead).

24. The method according to claim 20 further comprising the step of determining an aspect of said order from said scanning of said hard copy image product and for verification of said hard copy image product with said order information.

25. The method according to claim 24 wherein said verification comprises determining if said hard image products matches said order information.

26. A system for printing and automatically forwarding hard copy image products to a designated recipient, comprising:
   an image server having a processor for analyzing a digital image and developing a unique ID with respect to said image based on said analysis;
   a database connected to said server for storing said unique ID and associated order informations, said order informations including additional information and a designated recipient for receiving said hard copy image product made using said digital image;
   a first printer connected to said server for printing said digital image onto a medium to obtain a hard copy image product;
   a scanner connected to said server for digitally scanning said hard copy image product, said scan data being analyzed by said processor to obtain said unique ID and access said database for obtaining said order informations using said unique ID; and
   a second printer for printing said additional information for use in forwarding said hard copy image product to said designated recipient.

27. The system according to claim 26 wherein said second printer prints said information on a non image-bearing portion of said image hard copy image product.

28. The system according to claim 26 wherein said hard copy image product comprises one of the following:
   a print;
   a post card;
   a print with border;
   a folded greeting card;
   a poster; and
   a mug.

29. The system according to claim 26 wherein said additional information comprises at least one of the following:
- name and address of recipient;
- message to recipient;
- date and/or time; and
- graphics (company logo or letterhead).

30. The system according to claim 26 further comprising the step of determining as aspect of said order from said scanning of said hard copy image product and for verification of said hard copy image product with said order information.

31. The system according to claim 26 wherein said verification comprises determining if said hard image products matches said order information.

32. A method of automatically forwarding hard copy image products to a designated recipient, comprising the steps of:

analyzing a digital image and developing a unique ID with respect to said image based on said analysis;

storing said unique ID and associated order information with respect to said image in a storage database, said order information includes a designated recipient for receiving a hard copy image product made using said digital image;

printing said digital image on to a medium using a first printer so as to obtain said hard copy image product;

scanning said hard copy image product subsequently by a scanning device and analyzing said digital image so as to obtain said unique ID and accessing said database for obtaining said order information using said unique ID, said scanning information is also used to obtain product information regarding said hard copy image product; and using said product information for verification with said order information.

33. The method according to claim 32 wherein said verification comprises determining if said hard image products matches said order information.

* * * * *